(12) United States Patent
Wang et al.

(10) Patent No.: US 7,450,125 B2
(45) Date of Patent: *Nov. 11, 2008

(54) METHOD AND SYSTEM FOR REPRESENTING AND DISPLAYING DIGITAL INK

(75) Inventors: Jian Wang, Beijing (CN); Yu Zou, Bejing (CN); Liyong Chen, Beijing (CN); Siwei Lyu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 122 days.

This patent is subject to a terminal disclaimer.

(21) Appl. No.: 11/446,491

(22) Filed: Jun. 1, 2006

(65) Prior Publication Data

US 2006/0290698 A1    Dec. 28, 2006

Related U.S. Application Data

(63) Continuation of application No. 09/894,824, filed on Jun. 28, 2001, now Pat. No. 7,057,615.

(51) Int. Cl.
*G06T 11/20* (2006.01)

(52) U.S. Cl. .................. 345/442; 345/502; 345/532; 345/543

(58) Field of Classification Search ............. 345/442, 345/443
See application file for complete search history.

(56) References Cited

U.S. PATENT DOCUMENTS 5,361,333 A   11/1994   Ahlquist et al. ............ 345/442
5,367,617 A   11/1994   Goossen et al. ............ 345/442

(Continued)

OTHER PUBLICATIONS

Barsky etal., "Geometric Continuity of Parametric Curves: Three Equivalent Characterizations," *IEEE Computer Graphics & Applications 89*, pp. 60-68 (Nov. 1989).
Bengtsson et al., "Shape and Representation by Multiscale Contour Apprximation," *IEEE Transaction on Pattern Analysis and Machine Intelligence*, vol. 13, No. 1, pp. 85-93 (Jan. 1991).

(Continued)

*Primary Examiner*—Kimbinh T Nguyen
(74) *Attorney, Agent, or Firm*—Workman Nydegger

(57) ABSTRACT

A method and system for compressing and displaying a digital ink trace. Raw ink data is smoothed, and sharp points of the smoothed line are found. Curve-fitting is then used to generate a mathematical expression that defines the line segments between adjacent sharp points. The ink trace then is represented by a backbone spline that includes the sharp points and the mathematical expressions for the line segments. Thickness information, such as pressure or acceleration information, is combined with the backbone spline to provide a compressed ink file that represents a contour curve of the original ink trace. A display module uses an algorithm to separate the contour curve into a sequence of straight lines. A set of pixels is then generated for the display of each straight line using a novel antialiasing method. The pixels at the ends of adjacent straight lines are aligned using a weighting algorithm.

18 Claims, 11 Drawing Sheets

U.S. PATENT DOCUMENTS

| | | | |
|---|---|---|---|
| 5,434,959 | A | 7/1995 | Von Her et al. ............ 345/442 |
| 5,594,855 | A | 1/1997 | Von Her et al. ............ 345/442 |
| 5,940,082 | A | 8/1999 | Brinegar et al. ............ 345/442 |
| 6,208,355 | B1 | 3/2001 | Schuster .................... 345/442 |
| 2002/0093501 | A1 | 7/2002 | Lui et al. .................... 345/442 |

OTHER PUBLICATIONS

Blinn, James F., "Jim Blinn's Courner: Return of the Jaggy," *IEEE Computer Graphics & Applications*, pp. 82-89 (Mar. 1989).

Blinn, James F., "Jim Blinn's Courner: What We Need Around Here Is More Aliasing," *IEEE Computer Graphics & Applications*, pp. 75-79 (Jan. 1989).

Foley et al., "*"Computer Graphics, Principles and Practice, Second Edition*," Addison-Wesley, Chapter 11, pp. 471-531 (1990).

Forrest, A.R., "*Antialiasing in Practice: Fundamental Alogorithyms for Computers*," Springer-Verlag, pp. 113-134 (1985).

Gupta et al., "Filtering Edges for Gray-Scale Displays: *Computer Graphics*," vol. 15, No. 3, pp. 1-5 (Aug. 1981).

Mitchell et al., "Reconstruction Filters in Computer Graphics," Computer graphics, vol. 22, No. 4, pp. 221-228 (Aug. 1988).

Mokhtarian et al., "A Theory of Multiscale, Curvature-Based Shape Representation for Planar Curves," IEEE Transactions on Pattern Analysis and Machine Intelligence, vol. 14, No. 8, pp. 789-805 (Aug. 1992).

Plass et al., "Curve-Fitting with Piecewise Parametric Cubics," ACM Computer Graphics, vol. 17, No. 3, pp. 229-239 (Jul. 1983).

METHOD AND SYSTEM FOR REPRESENTING AND DISPLAYING DIGITAL INK

CROSS-REFERENCE TO RELATED APPLICATION

This application is a continuation of copending U.S. patent application Ser. No. 09/894,824, filed Jun. 28, 2001, now U.S. Pat. No. 7,057,615, which is hereby incorporated by reference.

FIELD OF THE INVENTION

The invention relates generally to computers, and more particularly to digital ink information.

BACKGROUND OF THE INVENTION

Digital ink technology enables a user to write and draw on the touch-sensitive screen of a handheld PC or other writing tablet with a stylus or other pointing device, providing a convenient means for applications to accept input from a user without using a keyboard. For a user, taking notes or drawing sketches using digital ink technology is very much like writing or drawing on paper.

Contemporary digital ink technology is capable of extracting a variety of information from an ink trace that a user makes using digital ink technology, including vector, timing, coordinates, angle of the stylus, and additional information. The digital ink information may be provided to an application, and may be used for many purposes, such as for handwriting recognition. The digital ink information may also be used for improving the way handwriting is displayed, including providing higher resolution, editing, smoothing, and alteration of individual elements, for example.

One problem with digital ink technology is that the files generated from a user's handwriting are typically large. Generally, the file consists of a sequence of points where the user has contacted the writing surface, as well as additional digital ink information such as discussed above. The size of the files can be a problem, for example, where the digital ink file needs to be transmitted, where a large number of the digital ink files need to be stored, or where the digital ink file needs to be processed, such as for display or handwriting recognition.

Contemporary technologies exist for compression of digital ink information. However, typically so much information is lost during compression that the compressed file does not accurately represent the shape information of the original ink trace, which may result in poor display or recognition.

Another problem with digital ink technology is in display. Often, even if the original ink data is used, it is difficult to display a representation of the actual ink trace because of the resolution limitations of a monitor or other display device. The sequence of points representing the ink trace may not properly align with the pixels on the monitor, and present technologies do not provide a feature that permits the view on the monitor to accurately represent a visual presentation of an item (e.g., point or portion of a line) in a position that does not align with a pixel on the display.

Often, contemporary display software includes antialiasing effects, which provide different graying levels for pixels on a display in an attempt to display a representation of an item that should be located only partly on the grayed pixels. However, when lines or curves are rendered with an antialiasing technique, the rendered image of these lines and curves has a ripple contour, which makes rendered shapes have different widths at different parts. Having different widths is caused by the variance of gray levels value along the line or curve. This effect is most obvious when the line or curve being rendered is relatively long. In lines that are nearly horizontal or vertical, the rippled effect is particularly pronounced.

SUMMARY OF THE INVENTION

The present invention provides a method and system for representing and displaying digital ink information. In accordance with one aspect of the present invention, a new format for digital ink data is provided that is substantially compressed compared to original digital ink data of an ink trace, but substantially preserves the shape information of the ink trace. To this end, the present invention provides a conversion module that converts raw ink data into a new compressed ink data format.

In accordance with one aspect of the present invention, the conversion module denoises the raw ink data, for example by using a conventional smoothing filter. Denoising gets rid of, among other things, bad data-noise from transmission, and duplicate data entry. After denoising, sharp points of the smoothed line are found. The sharp points represent the points of the raw data ink trace that deviate the most from straight lines (i.e., have the most curvature), or at which curvature reverses. Curve-fitting is then used to generate a mathematical formula that defines the line segments between adjacent sharp points. The ink trace then is represented by a backbone spline that includes the sharp points and the mathematical formulas for the line segments.

The backbone spline does not include thickness information. In accordance with another aspect of the present invention, thickness information, such as pressure or acceleration information, is combined with the backbone spline to provide a compressed ink file that represents a contour curve of the original ink trace. The contour curve may be combined with the backbone spline in real time, wherein the contour curve is saved as the compressed date file. Alternatively, the backbone spline and thickness information may be saved, and the contour curve may be generated in real time (e.g., generated when needed for display or recognition).

In accordance with another aspect of the present invention, a display module is provided that generates an image from the compressed file that closely represents the original ink trace. To this end, the display module separates an image (e.g., the contour curve) into a sequence of straight line segments. A set of pixels is then generated for the display of each straight line segment using a novel antialiasing method. The antialiasing method utilizes a decreasing factor over the cross-section of a scan line so that the edges of the scan line are filtered more than the center. In this manner, the antialiasing method locally adjusts pixel graying levels for each scan line. The decreasing filter effectively reduces the graying level as the distance of a pixel increases from the line center, but maintains enough graying so that antialiasing is effective. The effect is that the image is rendered with substantially less ripples than an image that is rendered using contemporary antialiasing methods.

In accordance with another aspect of the present invention, after the image is altered with the antialiasing filter, the ends of the sets of pixels of adjacent straight lines are aligned by using an averaging algorithm. The generated and realigned pixels may then be rendered on a display device such as a monitor.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features may be omitted or simplified in order not to obscure the present invention.

Exemplary Operating Environment

Figure 1:
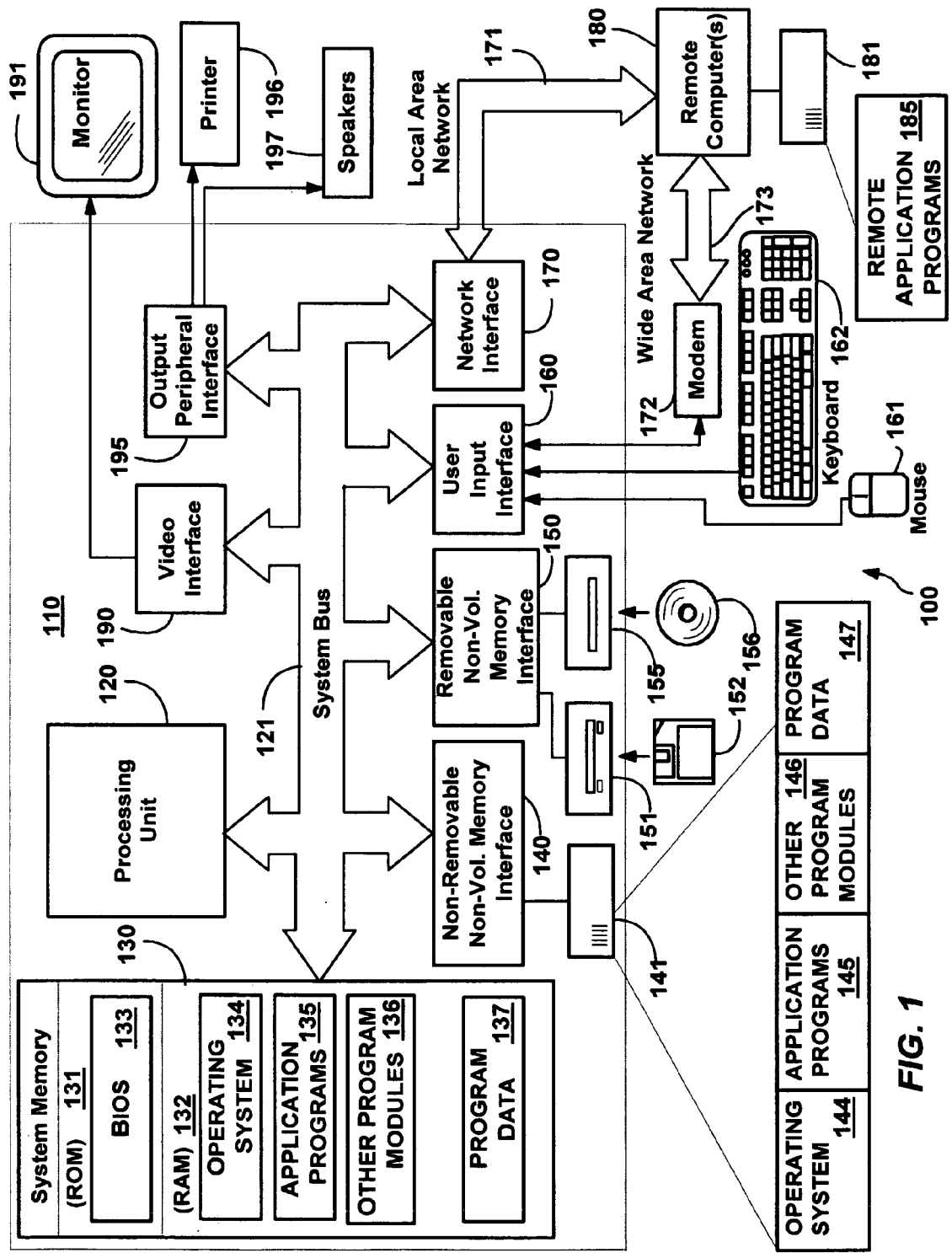
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

System for Representing and Displaying Digital Ink

Typically, a user writing on a touch-sensitive screen or tablet generates digital ink information with a stylus or other digital ink generator. Generally, digital ink technology stores and/or processes information about stylus, mouse, or other pointer movements, along with enhanced information such as calculated vector information, pressure, timing, strokes, angle of stylus, italic and bold states, and the like. There are a variety of different digital ink formats, and the additional information that the format can store or process with the pointer movements varies for the different applications.

In summary, one aspect of the present invention is directed to a system and method for creating a compressed representation of a digital ink file. The compressed ink file closely represents the original ink trace made by a user, but is substantially compressed compared to the original ink data. The present invention additionally is directed to a system and method for displaying a digital ink file, such as the compressed digital ink file. The displayed representation closely represents the original ink trace made by the user.

Figure 2:
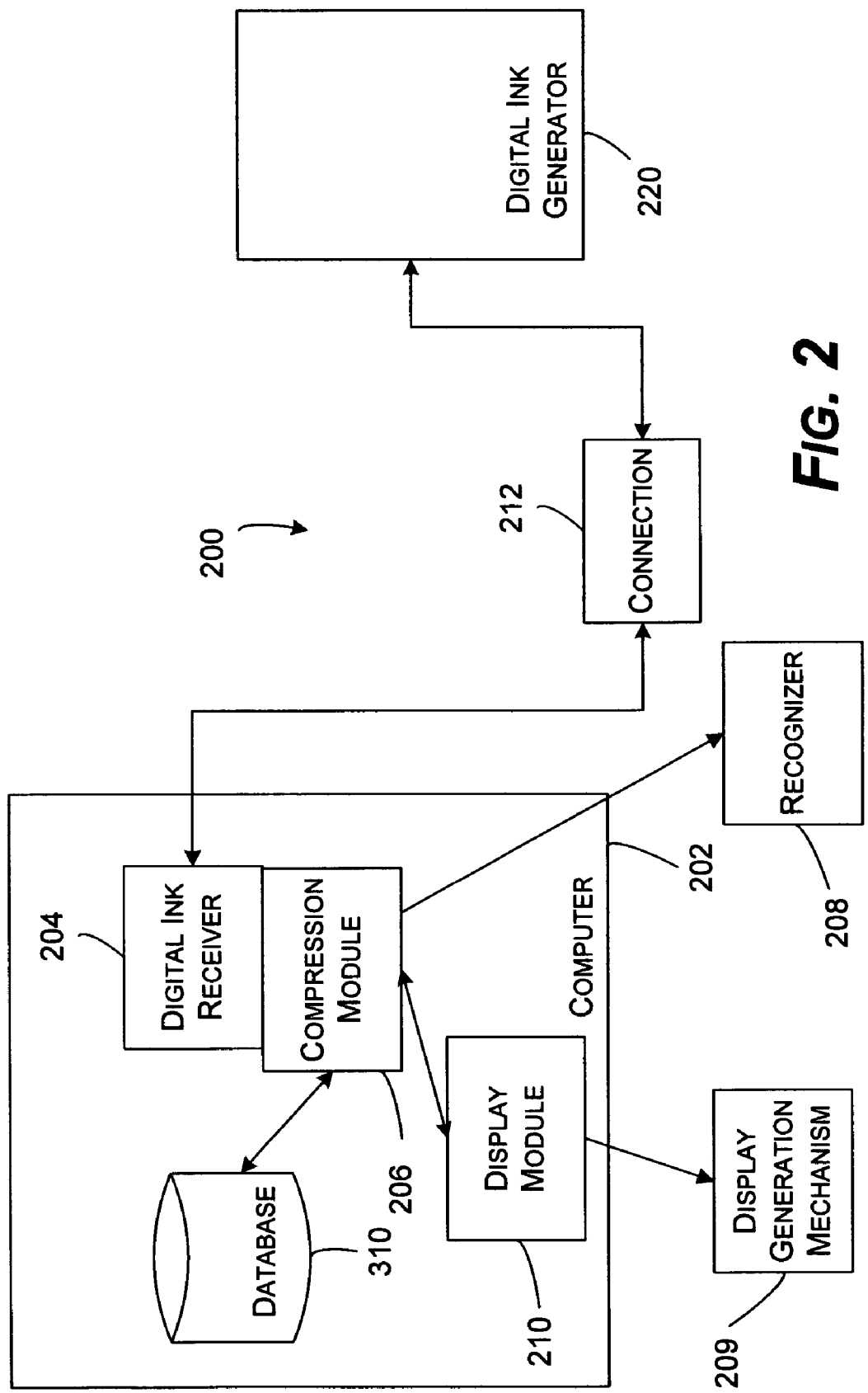
FIG. 2 is a block diagram representing an architecture for a system for compressing a digital ink file in accordance with one aspect of the invention.

Turning now to the drawings, FIG. 2 shows generally an architecture for a system 200 for compressing a digital ink file in accordance with one aspect of the invention. The system 200 includes a computer 202 (e.g., the computer 110) having a digital ink receiver 204. The digital ink receiver 204 receives raw data generated by a user's writing movements, processes that data if necessary, and forwards corresponding appropriate data to the appropriate software, such as the operating system or an application. In this manner, the digital ink receiver 204 enables a user to input information into a computer utilizing a digital ink generator such as a writing tablet, and without having to use a keyboard.

In accordance with one aspect of the present invention, the digital ink receiver 204 includes, or alternatively is associated with, a compression module 206, which is configured to convert the original ink data into a compressed ink file, as is further described below. The digital ink receiver 204 and the compression module 206 may be provided on a single PC (e.g., the personal computer 202), or the compression module 206 may be provided on a separate machine from the digital ink receiver 204. In addition, their various functions may be performed by a single device or by several devices.

The compression module 206 may be connected to a recognizer 208 and/or a display generation mechanism 209, each of which may be integrated with, or separate from, the computer 202. One or both of these components, or other software including the operating system for the computer 202, may utilize the output of the compression module 206. In accordance with one aspect of the present invention, and as further described below, a display module 210 may be provided for generating display information for a digital image file, such as a compressed digital ink file generated by the compression module 206. The display module 210 may forward the display information to a monitor or display, such as the display generation mechanism 209. The display module 210 and the compression module 206 may be provided on a single PC (e.g., the personal computer 202), or the compression module 206 may be provided on a separate machine from the display module 210. In addition, their various functions may be performed by a single device or by several devices.

The computer 202 is connected via a connection 212 to a digital ink generator 220, which is a mechanism that generates digital ink, for example, as a result of writing movements by a user. The digital ink generator 220 may be, for example, a writing tablet that receives writing input via a stylus, or a pen that incorporates components (e.g., an accelerometer) that generate digital ink information as a result of writing movements by a user. As another example, digital ink may be generated as a result of curve tracing of a digital image. The digital ink data is transmitted to the computer 202 via the connection 212.

The connection 212 may be hardwired or wireless (wherein if wireless, the connection is conceptual, e.g., line-of-sight for infrared, or within range for FM transmissions, and so forth). As some examples, the computer 202 may be located remotely from the digital ink generator 220, and transmission of digital ink from the digital ink generator 220 to the computer may occur via a wireless transmission, a local area network (e.g., the LAN 171), a wide area network (e.g., the WAN 173), the Internet, or through another network or similar connection. Alternatively, digital ink information may be stored in memory in the digital ink generator, and may be later downloaded to the computer 202. In addition, some or all of the functions of the digital ink receiver 204, the compression module 206, and the display module 210 may be provided in the digital ink generator, although in practice, such a design may result in a mechanism that may be too cumbersome for comfortable digital ink input.

Figure 3:
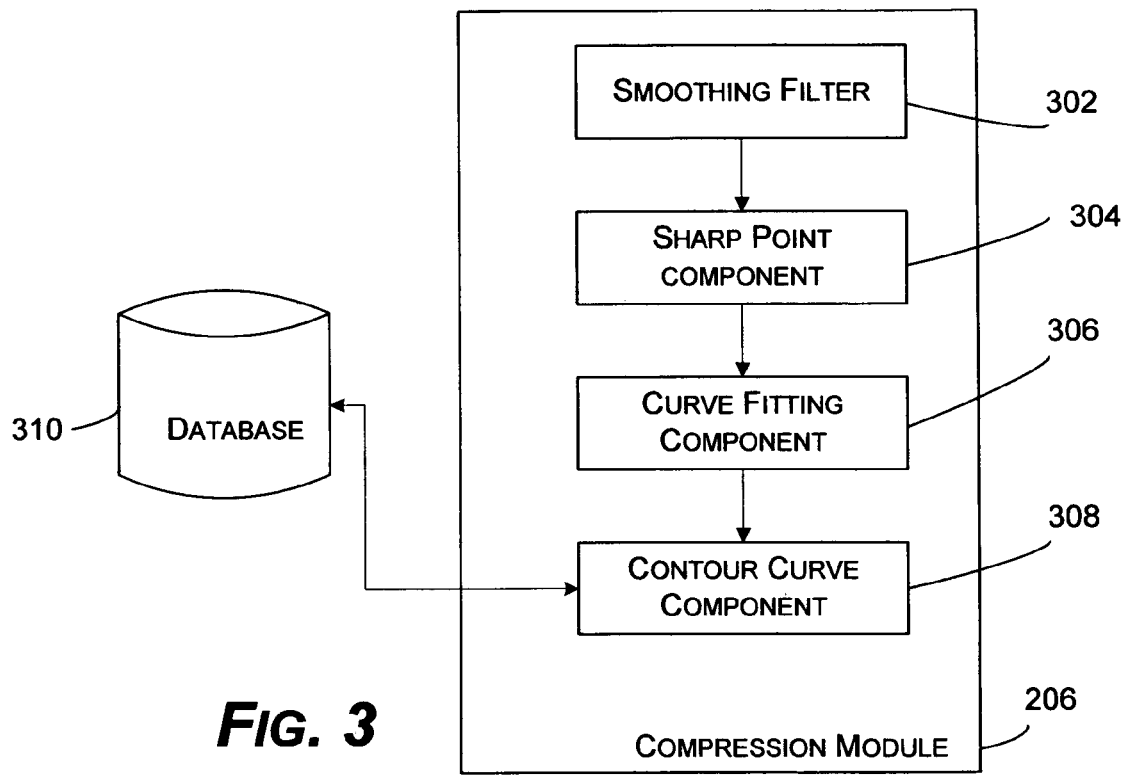
FIG. 3 is a block diagram representing an architecture of a compression module in accordance with an aspect of the invention.

FIG. 3 shows a block diagram representing an architecture of the compression module 206 in accordance with an aspect of the invention. The compression module 206 includes a smoothing filter 302, a sharp point component 304, a curve-fitting component 306, and a contour curve component 308. The contour curve component 308 is associated with one or more databases 310 (only one is shown in the figures). The function and operation of each of these components is described below.

Compressing the Original Digital Ink

Figure 4:
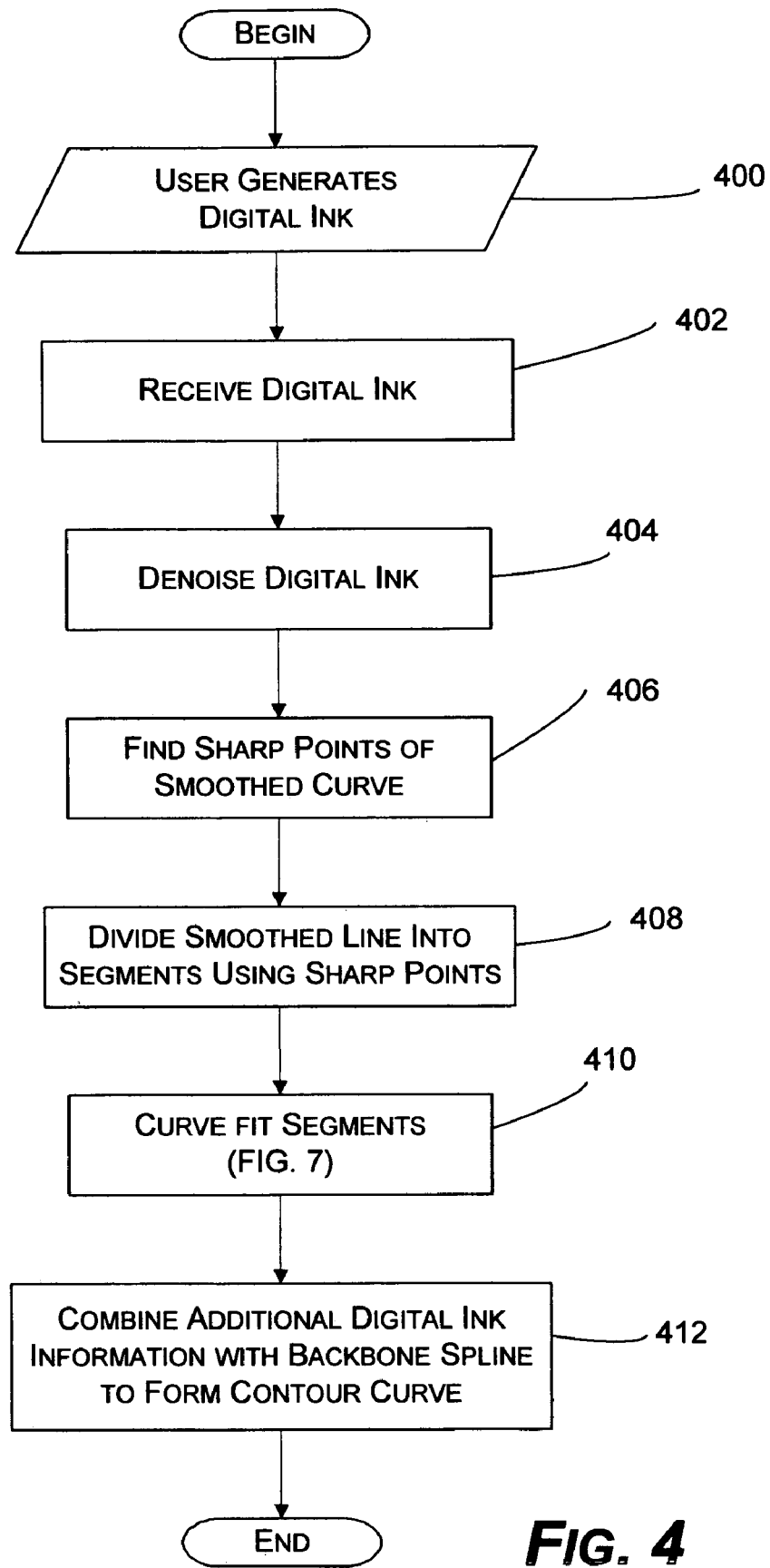
FIG. 4 shows a general overview of a process for compressing digital ink information in accordance with one aspect of the present invention.
Figure 5:
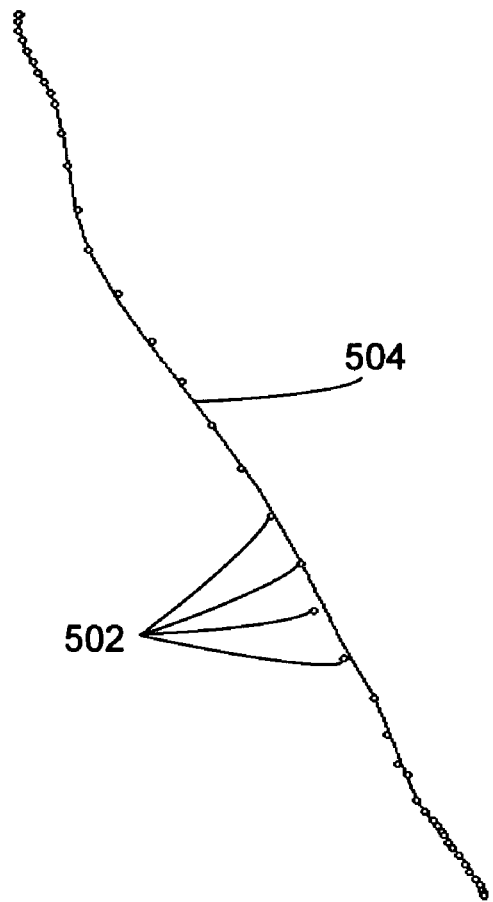
FIG. 5 is a representation of an ink trace formed by a digital ink generator of the present invention.

FIG. 4 shows a general overview of a process for compressing digital ink information (e.g., via the compression module 206) in accordance with one aspect of the present invention. Beginning at step 400, a user generates digital ink using the digital ink generator 220. In general, as can be seen in FIG. 5, the original digital ink data includes a series of points 502 that represent an ink trace 504 made by the user. If a touch-sensitive screen is utilized, additional digital ink information, such as calculated vector information, pressure, timing, strokes, angle of stylus, and the like, may be generated by the touch-sensitive screen or tablet. At step 402, the points 502 and additional digital ink information (if available) are transferred to the computer 202 via the connection 212 and are received by the digital ink receiver 204.

At step 404, denoising (for example, by the smoothing filter 300 of the compression module 206) of the sequence of points 502 occurs to eliminate a lot of the data noise. A variety of denoising methods may be used to eliminate the noise, but preferably, care must be taken not to eliminate too many details that might be useful. A simple method for denoising the curve is to filter the curve with a low-pass filter. Although such a system works well to eliminate noise, some useful details of the original point data may be lost. A much better smoothing solution utilizes the theory of multi-scale curvature space such as is described in "Shape Representation by Multi-scale Contour Approximation," Ann Bengtsson and Jan-Olof Eklundh, IEEE Transaction on Pattern Analysis and Machine Intelligence, 1991, but the method is complicated and slow, and requires more processing power than may be available. A good compromise involves resampling of the original sequence of points to a particular scale. Resampling involves basically converting the image data to another resolution scale. If a larger scale (less resolution) is used for resampling, more details of the original ink trace will be lost, whereas if a smaller scale (more resolution) is used, more details will be kept. Other denoising techniques may be used.

At step 406, the sharp points of the denoised data curve are found (e.g., by the sharp point component 304 of the compression module 206). The sharp points are the points that contain important shape information of a curve and are helpful for keeping much of the details of the original ink trace. Briefly described, in accordance with one aspect of the present invention, finding the sharp points of the smoothed data curve involves finding the places in the smoothed curve where the curvature is most dramatic, or where the curvature changes directions. The changes in direction may be cusps, or may be positions where the curve changes from counter-clockwise curvature to clockwise curvature, or vice-versa.

To find the sharp points, the tangent and curvature of the denoised curve is calculated for each point of the smoothed curve using Differential Geometry. If a cusp exists, the curvature of the cusp will be infinity. Using Differential Geometry, one can find all local extremes and all zero-crossing points of curvature. A local extreme of curvature is a critical point where the curve turns sharply, and a zero-crossing point of curvature is a critical point where the turning direction of the image changes (clockwise to counterclockwise, or vice-versa).

After the sharp points are located, the line is broken into segments between the sharp points at step 408. At step 410, the segments are curve-fit (e.g., by the curve-fitting component 306). In general, curve-fitting involves defining a curve with a mathematical expression. The process of curve-fitting the segments is discussed in connection with FIG. 7, below.

Figure 6:
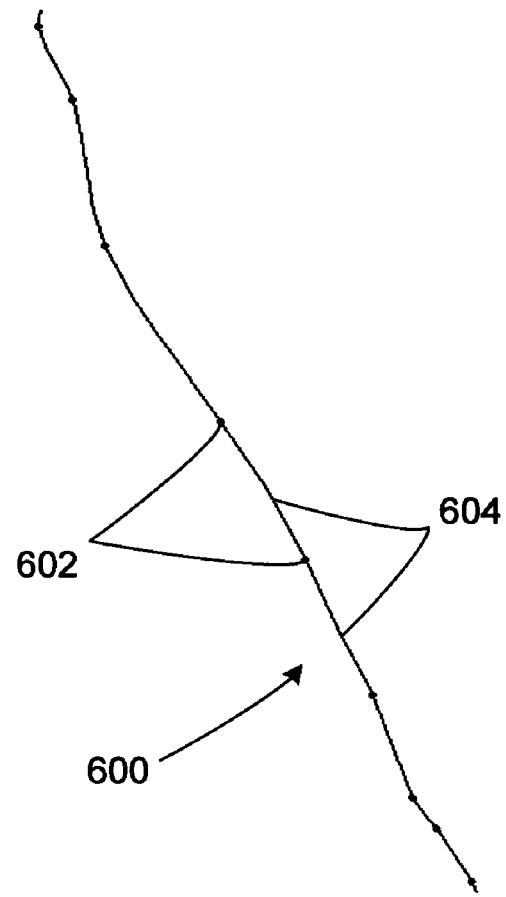
FIG. 6 is a compressed backbone spline created from the ink trace of FIG. 5 in accordance with one aspect of the present invention.

The expressions for the curve segments and the sharp points form a backbone spline 600 for the curve, as shown in FIG. 6. The sharp points 602 are maintained, and the segments 604 between the sharp points are defined by the curve-fitting mathematical expressions. This information is significantly less than the sequence of points 502 within the original digital ink file, but yet closely represents the curvature of the original ink trace.

At step 412, a contour curve is generated (e.g., by the contour curve component 308) using additional digital ink information, such as thickness information, and the backbone spline 600. The contour curve is a representation of the original ink trace made by a user, including additional information such as thickness. Using thickness information (such as is generated by pressure sensors, if available), the contour curve component 308 can provide instructions or other information to software or the display generation mechanism 209 that instructs the software or display generation mechanism to amplify the digital ink (e.g., by adding additional bits to a bitmap, or by increasing the thickness of lines in an application) in places where thickness information says the ink trace is to be thicker, or alternatively may indicate thin lines where thickness information says the ink trace is to be thinner. Additional ink information may be used to alter the backbone spline in other manners, such as by making lines darker in accordance with thickness information.

The contour curve may be generated in real time (i.e., as received by the compression module), and may be used immediately, or may be stored in the database 310, and retrieved as needed. Alternatively, thickness or other additional digital information may be stored in the database 310 along with the backbone spline 600, and the two may be combined as needed (e.g., when display of the ink trace is requested). The latter preserves resources so that processing power may be used for other tasks, such as to generate the backbone spline for another ink trace. If desired, the additional digital ink information may be stored in a separate database from the backbone spline 600, and may be accessed as needed.

Figure 7:
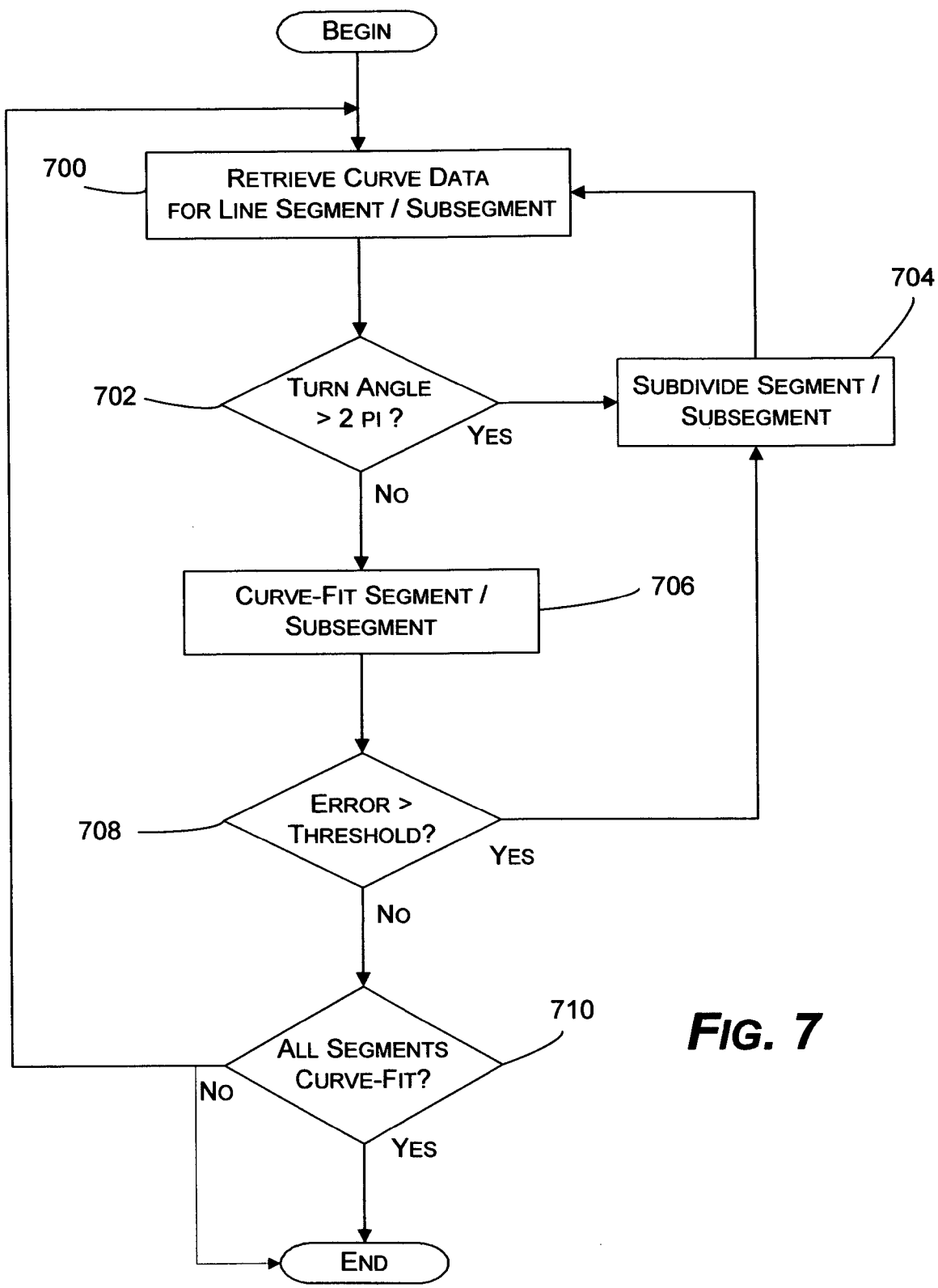
FIG. 7 shows a general overview of a process for curve-fitting line segments of the backbone spline of FIG. 6 in accordance with one aspect of the present invention.

FIG. 7 shows a general overview of a process for curve-fitting the line segments 604 of the backbone spline 600 in accordance with one aspect of the present invention. Beginning at step 700, curve data is retrieved for a line segment between adjacent sharp points 602. The curve data may include, for example, the smoothed line information that was generated during smoothing for the area between the sharp points 602.

At step 702, a determination is made whether the line segment has an accumulating turn angle larger than $2\pi$. If the accumulating turn angle is larger than 2 PI, at least one circle is present, which may be difficult to represent by a mathematical expression. If a circle is detected, step 702 branches to step 704, where the segment is subdivided, for example into two subsegments. The process then loops back to step 700, where the curve data for the subsegment is retrieved.

If the turn angle is not greater than $2\pi$, then step 702 branches to step 706, where curve-fitting of the segment or subsegment occurs. Curve-fitting is a mathematical method that uses a family of curves to approximate the curvature of a line. Each curve of the family is represented analytically by a mathematical expression.

There are several families of curves that are currently used for curve-fitting. As one example, the family of parametric piecewise-cubic curves may be used. This family of curves is widely used in mathematical theory and in the computer graphics field. Each parametric piecewise-cubic curve is defined by:

$$\begin{cases} f(t) = a_0 + a_1 t + a_2 t^2 + a_3 t^3 \\ g(t) = b_0 + b_1 t + b_2 t^2 + b_3 t^3 \end{cases}$$

The above form has the basis function $\phi_j = t^j$, where j=<0, 1,2,3>. There are two other basis functions used to express the parametric piecewise-cubic curve. One utilizes Bernstein polynomials $\phi_j = C_3^j t^j (1-t)^{3-j}$ as the basis function. For this basis function, the cubic curve is expressed as a cubic Bezier curve. The Bezier curve has four control points that define the shape of curve. There are a number of algorithms for defining a Bezier curve or spline that are known in the curvature art. In general, however, a Bezier spline of degree n is a polynomial interpolation curve defined by (n+1) points defining a Bezier Control Polygon. The interpolation basis functions used in Bezier interpolation are the Bernstein Polynomials defined for degree n as:

$$B_j^n(t) = \binom{n}{i} t^i (1-t)^{n-i}$$

The parameter t is in the range [0,1] and there are n+1 polynomials defined for each i from 0 to n.

The Bezier spline is therefore defined over the interval [0,1] as:

$$b(t) = \sum_{i=0}^{n} b_i \cdot B_i^n(t)$$

where $b_i$ are the Control Points defining the polygon.

Another basis function that may be used to the express the parametric piecewise curve is Hermit polynomials:

$$\langle \phi_0 = 2t^3 - 3t^2 + 1, \phi_1 = t^3 - 2t^2 + t, \phi_2 = t^3 - t^2, \phi_3 = -2t^3 + 3t^2 \rangle$$

Hermit polynomials have the form $f(t) = a_0 \phi_0 + a_1 \phi_1 + a_2 \phi_2 + a_3 \phi_3$. Parameter $a_j$ has a math meaning: $a_0 = f(0), a_1 = f'(0), a_2 = f(1), a_3 = f'(1)$. The cubic Hermit polynomials are useful for mathematical interpolation and curve-fitting.

Although a number of other curve-fitting curve families may be used, applicants have found that the parametric piecewise-cubic curves work particularly well because of the integrity of theory of the curve family. In addition, the algorithms used to define the family of curves are particularly accurate.

In accordance with another aspect of the present invention, when using the parametric piecewise-cubic curves, the sharp points at the ends of a segment are the first and last Bezier control points of the segment. The position and tangent of the sharp points is known. Subject to these limits of boundary, least squares method may be used to get a whole piecewise-cubic curve. If subsegments are used, then the end points for the subsegments, and the corresponding tangents, may be calculated.

After the segment or subsegment has been curve-fit, the process proceeds to step 708, where a determination is made whether the error of curve-fitting is above a defined threshold.

If so, then step 708 branches back to step 704, where the segment or subsegment is subdivided, for example into two subsegments. This method provides a simple way for accurate curve-fitting to occur, without substantial processing of difficult curves. On some difficult curves, single-piece cubic curve-fitting may not properly define a segment, and further processing may be required. In the paper Plass et al., "Curve-Fitting with Piecewise Parametric Cubics," (Computer Graphics, Volume 17, Number 3, July, 1983) the authors proposed to use dynamic programming to subdivide a segment that is not successfully curve-fit so as to get a better curve description. Although such a method may be used in the present invention, and may provide a more precise description than merely dividing a segment in half, the dynamic programming proposed in the article consumes more time and requires more complicated computation than the subdivision of segments proposed by the present invention. Additionally, by not attempting curve-fitting on segments having a turn angle greater than $2\pi$, the present invention consumes less processing power and time than the method using dynamic programming. Such time is valuable in the environment of real-time interaction.

If the error of curve-fitting is below the defined threshold, then step 708 branches to step 710, where a determination is made whether all segments or subsegments of the backbone spline have been curve-fit. If not, then the process loops back to step 700, where the curve information for the next segment is retrieved. If so, then the process ends.

The compression method of the present invention is advantageous in that it generates a compressed ink file that is substantially smaller than the original ink data information. Additionally, the process uses much less processing time that current compression techniques.

Displaying the Digital Ink File

Figure 8:
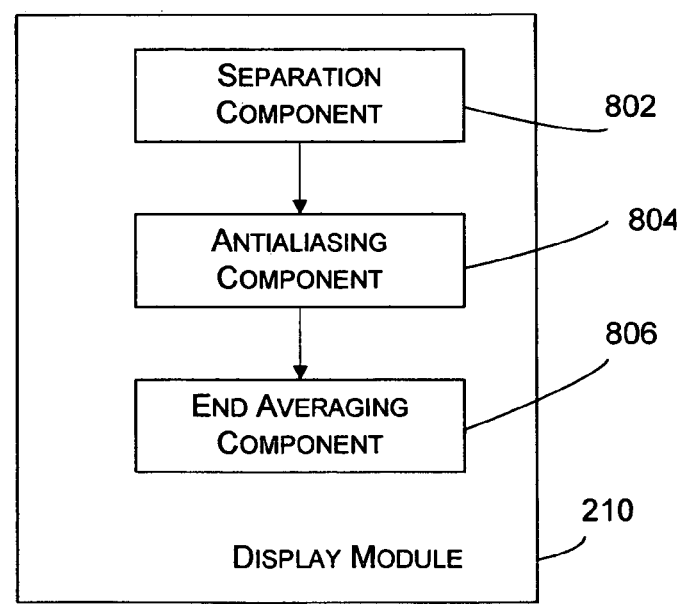
FIG. 8 is a block diagram representing an architecture for a system for displaying digital information in accordance with an aspect of the present invention.

FIG. 8 shows a block diagram representing an architecture of the display module 210 in accordance with an aspect of the present invention. The display module 210 includes a separation component 802, an antialiasing component 804, and an end-averaging component 806. The function and operation of each of these components is described below.

Figure 9:
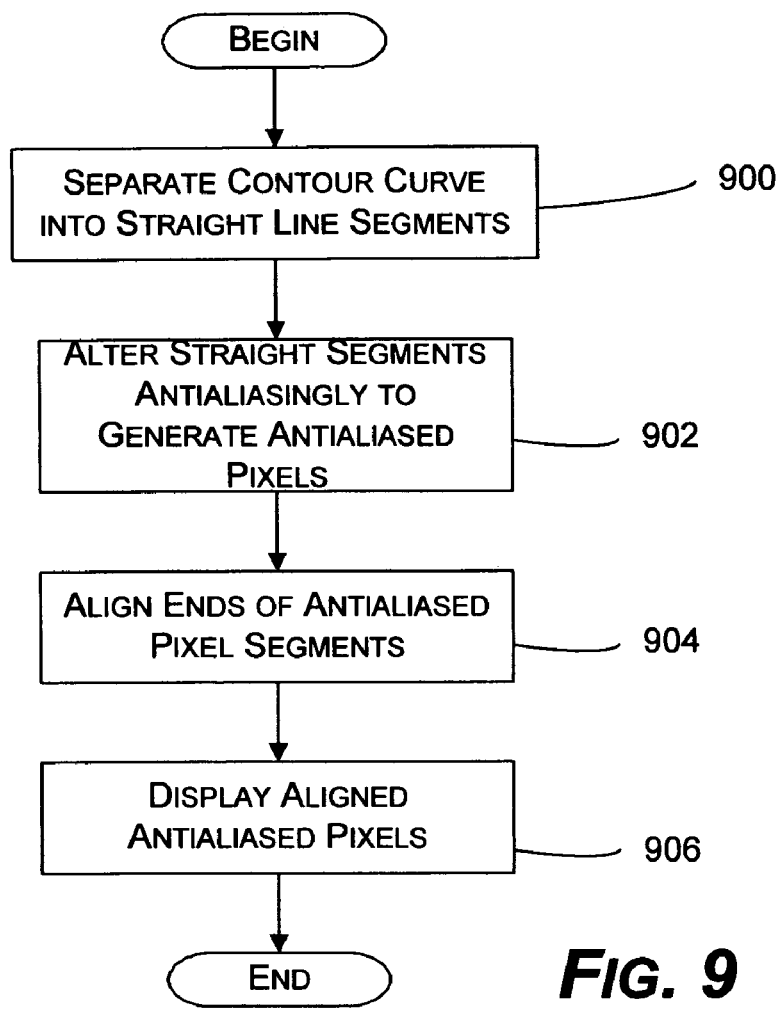
FIG. 9 shows a general overview of a process for displaying digital ink information in accordance with one aspect of the present invention.

FIG. 9 shows a general overview of a process for displaying digital ink information (e.g., via the display module 210) in accordance with one aspect of the present invention. Beginning at step 900, the contour curve is broken into a plurality of segments (e.g., by the separation component 802), each of which is a straight line. To do this, the contour curve may be separated, for example, into a number of straight line segments using an algorithm descending from de Casteljau's function for a Bezier curve. The de Casteljau function is known, but a brief description is given for the reader's benefit. The de Casteljau function is a recursive algorithm which calculates for a given control polygon the point that lies on the Bezier curve for any value of t, and can be used to evaluate and draw the Bezier spline without using the Bernstein polynomials (described above). The algorithm advances by creating in each step a polygon of degree one less than the one created in the previous step until there is only one point left, which is the point on the curve. The polygon vertexes for each step are defined by linear interpolation of two consecutive vertexes of the polygon from the previous step with a value of t (the parameter):

$$b_i^n = (1-t) \cdot b_i^{(n-1)} + t \cdot b_{i+1}^{(n-1)}$$

In general, by using this function, the contour curve is broken into a number of segments (e.g., 64), the segments being longer in length on straighter portions of the contour curve, and shorter on the parts of the curve having more curvature. In this manner, the straight segments can closely represent the actual shape of the contour curve, and the information for displaying each of the segments may be easily calculated.

At step 902, the straight line segments are altered antialiasingly (e.g., by the antialiasing component 804), using an improved antialiasing filter, as described further below. The process generates antialiased pixels. The antialiased pixels are aligned at the ends of adjacent straight lines at step 904 so that the resulting image looks smooth, as described further below in connection with FIGS. 16 and 17. The antialiased and aligned pixels are displayed at step 906, e.g., on the display generation mechanism 209.

Figure 10:
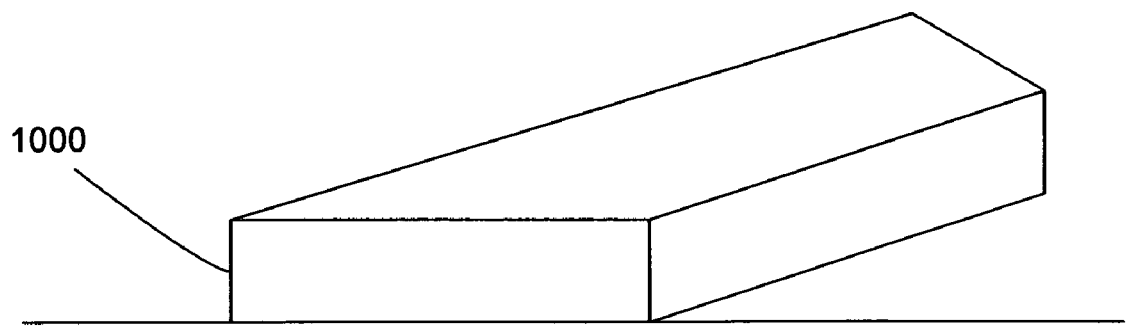
FIG. 10 shows a representation of a line prior to applying an antialiasing filter to the line in accordance with one aspect of the present invention.

To describe the antialiasing method of the present invention, it is helpful to discuss some common methods that are contemporarily used for antialiasing. In general, as can be seen in FIG. 10, a line image 1000 has the slice of a rectangular shape before antialiasing. Without antialiasing, pixels that fully or partly reside under the rectangular slice are rendered in an image of the line. Aliasing describes the effect of undersampling during digitization which can generate staircase steps (called "jaggies") along the edges of an image, which occur because the areas of the pixels, which are square, do not exactly align with the slanted edge of the image. Antialiasing provides a way of displaying the edges that permits the edges to look smoother. Simply described, antialiasing involves filtering the pixels that are on the edge of the rectangular slice so that the pixels that partly reside under the rectangular slice are partially illuminated (or grayed). In this manner, the edges of the image appear to be smooth.

The filtering process of antialiasing is represented by the convolution of the image signal by some filter function. This process can be expressed as the integral:

$$S(x, y) = \int_{-\infty}^{\infty} \int_{-\infty}^{\infty} I(t, s) h(t-x, s-y) ds dt$$

where S is the resulted sampled image made up of pixels at sample point (x, y), h(x, y) is the antialiasing filter, and the equation S(x, y) is called an antialiasing integral. In practice, there are two categories of algorithms which stimulate this antialiasing integral: over-sampling and pre-filtering. In general, pre-filtering adjusts the gray level of a pixel to be proportionate to the amount that the edge of the line extends over the pixel's area. Oversampling uses more than one sample for each pixel. The basic idea is that an image is generated of higher resolution than the display device can handle, and the pixels in the larger image are averaged to produce a single, grayed pixel that meets the resolution of the display device. Both types of antialiasing integrals are largely used in current graphics systems.

With the processes of pre-filtering and oversampling, jaggies on the contour of rendered images are largely eliminated and a much more aesthetic result is obtained. But when an antialiasing technique is used in the rendering of lines and curves, the contour of an item having a constant cross-section seems to have different widths along its length, resulting in the lines having a rippled contour. The ripple contour phenomenon is caused by the different gray level used along the line or curve. Different gray levels are used because, for contemporary antialiasing methods, the amount the pixels are grayed is directly proportional to the distance between the center of the pixels surrounding an image to the line that is being imaged. This distance varies, causing the total graying at locations along the rendered line vary. The difference in graying levels along the line gives the line the rippled look.

The ripples are most obvious when the line or curve being rendered is very long. Most horizontal and vertical lines show this effect, unless the lines (horizontal or vertical) are exactly aligned with the pixels that are displaying the image. Although thought to be much better than jaggies, ripple contour can also compromise visual effects of the rendered image. For the rendering of very large font, this artifact may compromise what antialiasing has done by making the antialiased edges still show irregularities.

Two factors are necessary for the ripple contour to be generated: one is the finite resolution of the display device, and the other is antialiasing using the same filter everywhere. Since these two factors are theoretically innate to any antialiasing method, it does not matter whether over-sampling or pre-filtering is used, the rendered image still includes the rippled effect. To give further explanation, antialiasing rendering of a line is described.

Theoretically an ideal line with zero width is a series of dots on a two-dimensional plane, which is represented in mathematics as a delta function:

$$\delta(x-x_0, y-y_0) = 0 \text{ if } (x, y) \neq (x_0, y_0)$$
$$\int_{-\infty}^{\infty}\int_{-\infty}^{\infty} \delta(x-x_0, y-y_0)dxdy = 1$$

The antialiasing image of a line is the sum of the antialiasing image of each dot on the line. Using an antialiasing integral S, the response of the filter to the delta function can be determined for a dot centered at (a, b) by the integral:

$$S(x, y) = \int_{-\infty}^{\infty}\int_{-\infty}^{\infty} \delta(t-a, s-b)h(t-x, s-y)dsdt$$

With the property of delta function, the result of this integral is h(x−a,y−b). For sake of simplicity and efficiency, h is a center symmetric function, whereby the result can be further changed to:

$$h(\rho), \rho = ((x-a)^2 + (y-b)^2)^{\frac{1}{2}}$$

If this filter is used for every dot on the line, the sampled image's value at pixel (x, y) is solely determined by the distance (hereinafter referred to as "d") from the pixel to the dot (a, b). Thus, the sampled image's gray level is solely dependant on d if filter form is constant over all points on the line.

Ideal line image is sampled using scan conversion algorithms. For a given function of a line, scan conversion algorithms calculate the distance from the line to pixels which are candidates to render, and selects the nearer one. When a pixel is determined by a scan conversion algorithm to be rendered next, the vertical (or horizontal) distance d between that a pixel's center and the point on the line with the same x (or y) coordinate is computed by the difference between their y or x coordinates.

For an ideal line, the energy is equal everywhere, which means the sampled image should have an equal summed value along each scan line. If the resolution is infinite, each filter's center will exactly reside on a point on the line, so every point on the line has a sample value of h(0), and they are equal to each other, which will result in a uniform width image.

For finite resolution, since the sampled value is determined by d, and d is subject to change, the width of the line varies. For a simple digital differential analyzer (DDA) scan conversion algorithm, the value of d can be calculated in a forward differencing way as:

$$d_{n+1} = d_n + k. \text{ If } \text{round}(d_n + k) = \text{round}(d_n)$$
$$d_{n+1} = d_n + k - 1 \text{ Otherwise and } d_0 = 0$$

k is the slant of the line, calculated by:

$$\frac{(y_{end} - y_{start})}{(x_{end} - x_{start})}$$

and $d_n$ is the nth d value calculated from the starting point of line. From above equation, only for very rare occasions (for example when k=0, 1 or ∞) will the value of d along the line be a constant value. So it is almost impossible for an antialiased line to have constant gray level values along its length. Since conventional over-sampling algorithms and pre-filtering algorithms both depend on line scan conversion algorithms, each have the problem of a ripple contour.

Figure 11:
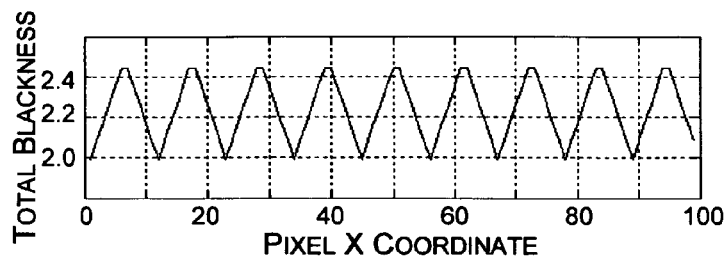
FIG. 11 is a chart generally showing variance of gray level along a line drawn from location (1, 1) to (100, 10), showing the inequality of gray level along the line using a conventional antialiasing filter.

As an example, FIG. 11 is a chart generally showing the variance of gray level along a line drawn from location (1, 1) to (100, 10), showing the inequality of gray level along the line using a conventional antialiasing filter. The change in gray levels along the line is the result of different d values being plugged into the same filter function at different locations along the line, which leads to different sampled values. Variant sampled values, when finally rendered on display devices, cause the inconsistency in the width (i.e., ripples) of the contour.

Figure 12:
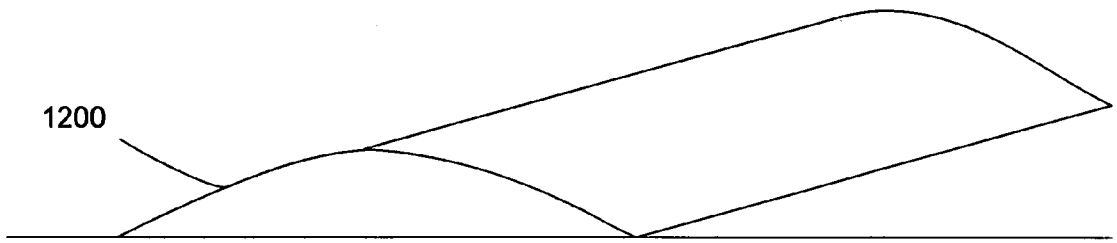
FIG. 12 shows a representation of a line after applying an antialiasing filter in accordance with one aspect of the present invention.

In accordance with one aspect of the present invention, the antialiasing component 804 diminishes the rippled contours in a rendered image. As described further below, the antialiasing component 804 uses multiple filters for each coordinate of an image, and slightly changes the shape of the filters used for different pixels being rendered locally (for example, along a constant coordinate value). By doing this, the inconsistency in width along a line and/or curve is largely reduced. In essence, as shown in FIG. 12, the filtering algorithm of the present invention changes the line image to a slice 1200 that is symmetric about its center, and that slopes downward to its edges. In this manner, the displayed image of the line has a more consistent graying level along its length, diminishing the rippled contour of the rendered image.

In accordance with one aspect of the present invention, the classical GUPTA-SPROULL algorithm is used as the basic procedure to render the antialiased line. This algorithm is described in the article "Filtering Edges for Gray-Scale Displays," Computer Graphics, vol. 22, pages 221-228 (ACM SIGGRAPH, July 1981).

In general, the antialiasing component 804 includes a novel filtering function that automatically creates pixel display information for multiple (in this example, three) pixels along a scan line for each datum point in an image. The filters for the outer two pixels are decreased relative to the center filter by a decreasing factor, β, which causes the outer two filters to provide less graying of the image of the respective pixels relative to the central filter. In this manner, the contrast between adjacent pixels on the outer edge of an image is reduced, thereby hiding the perception of change in gray levels, effectively reducing the rippled effect. In this manner, the line image takes the shape of the line image in FIG. 12.

β is preferably constant along the line. In accordance with one aspect of the present invention, as described further below, β is calculated based upon contrast sensitivity of humans.

The use of three filters, with the outer two filters decreasing graying at the pixels by the decreasing factor, β, sharpens the edge of a line. Filtering occurs for each pixel, and the amount the pixel is filtered (and therefore the amount the pixel is illuminated) is based upon the distance of the particular pixel to the actual datum point.

For ease of reference, an example of a straight line consisting of a series of linear datum points is described. Also for ease of discussion, the line is located in the first octant, where x and y are both positive and the slant of the line is less than 1. The rendering procedure happens in the x direction.

Figure 13:
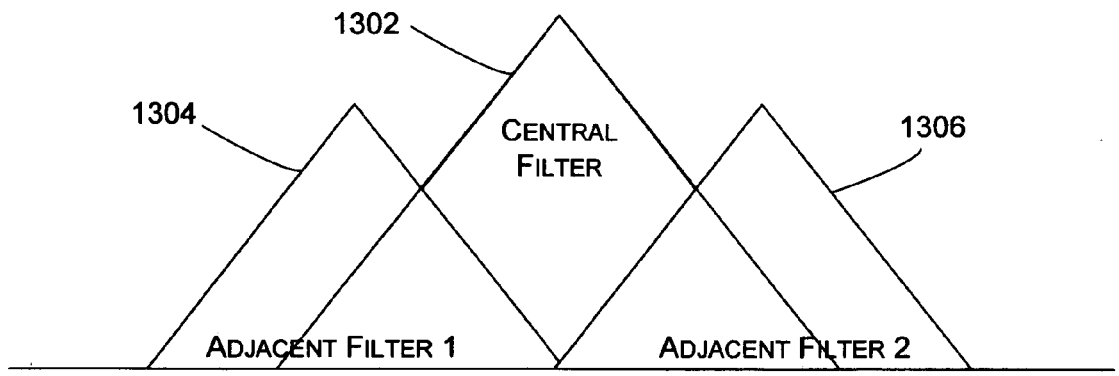
FIG. 13 is a representation of a pattern of filtering by an antialiasing filter in accordance with one aspect of the present invention.

In each step of the scan conversion of the line, three pixels perpendicular to the direction of the line are rendered to soften the edge of line. The distances of a point on the line with same x value to each of these three pixels is used as index for the filtering. Conical filters are used for each of the three pixel locations for their simplicity. In contrast to the original GUPTA-SPROULL algorithm, the present invention uses a different conical filter 1302, 1304, 1306 (FIG. 13) for each of the three different pixels for one x value. These filters have the same slant angle, but with different heights, as shown in FIG. 13.

When the GUPTA-SPROULL algorithm is used to render an antialiasing line, along the direction of y axis, the sample pixel's two direct neighbors are also used to get the sample value. The distances of these two neighbor pixels to the line does not need to be calculated directly. Since the sample pixel's distance to the line which is denoted as d, the neighbor pixels' distances to the line may be calculated using $1/\sqrt{k^2+1} \pm d$, where k is the slope of the line. Using these distance values as an index, sample values can be extracted for these positions from the filtered image by analytical calculation or table look-up.

The present invention preserves the process of scan conversion to select candidate sampling positions, but when calculating the intensity value from the filtered image, the distance values that are obtained from the scan conversion process are transformed to do the local adjustment of the graying level of pixels. Instead of using the distance d to directly calculate intensity, a shrinking factor β is exerted on the value of d for the two neighbor pixels of the sample, and the intensity value obtained by using βd is used as the distance value for those pixels. For the outer two pixels, the distance values used are $1/\sqrt{k^2+1} \pm \beta d$. Adding the shrinking factor equals to moving the sampling position towards the line, resulting in a local adjustment.

To give an impression on how this simple local adjustment can reduce the variance of intensity along the rendered line image, an example is described using the antialiasing of an ideal line in the first octant using conic filter. Using an ideal line as the source signal is for the sake of simplicity: by definition an ideal line is made up of a series of 2D delta functions and the convolution of a 2D delta function with a filter function is just the value the filter function has at that delta function's center. This property facilitates the analysis by making the calculation of convolution a trivial task of evaluating filter function at a pixel position.

The average sampling intensity value of the filtered image on a scan line is $(3h-2a/\sqrt{k^2+1}-ad)/3A$, where h is the height of the conic filter, a is the slope of the cone and A is the area occupied by a pixel. The rippling in intensity is generated by the linear part of this equation. When the shrinking factor β is introduced, this average sampling intensity value changes to $(3h-2a/\sqrt{k^2+1}-a\beta d)/3A$, where the shrinking factor β served to reduce the difference between the maxima and minima of the average sampling intensity value along the line. This helps to reduce the rippling contour phenomenon.

In accordance with one aspect of the present invention, the decrease factor β is based upon the information known about the general contrast sensitivity of humans. Contrast sensitivity testing complements and extends the assessment of visual function provided by typical visual acuity tests. At the cost of more complex and time-consuming procedures, contrast sensitivity measurements yield information about an individual's ability to see low-contrast targets over an extended range of target size (and orientation).

Contrast sensitivity tests use sine-wave gratings as targets instead of the letter optotypes typically used in tests of acuity. Sine-wave gratings possess useful mathematical properties and researchers have discovered that early stages of visual processing are optimally "tuned" to such targets.

A contrast sensitivity assessment procedure consists of presenting the observer with a sine-wave grating target of a given spatial frequency (i.e., the number of sinusoidal luminance cycles per degree of visual angle). The spatial frequency is important in that it may closely represent the resolution of a display. The contrast of the target grating is then varied while the observer's contrast detection threshold is determined. Typically, contrast thresholds of this sort are collected using vertically oriented sine-wave gratings varying in spatial frequency from 0.5 (very wide) to 32 (very narrow) cycles per degree of visual angle.

Figure 14:
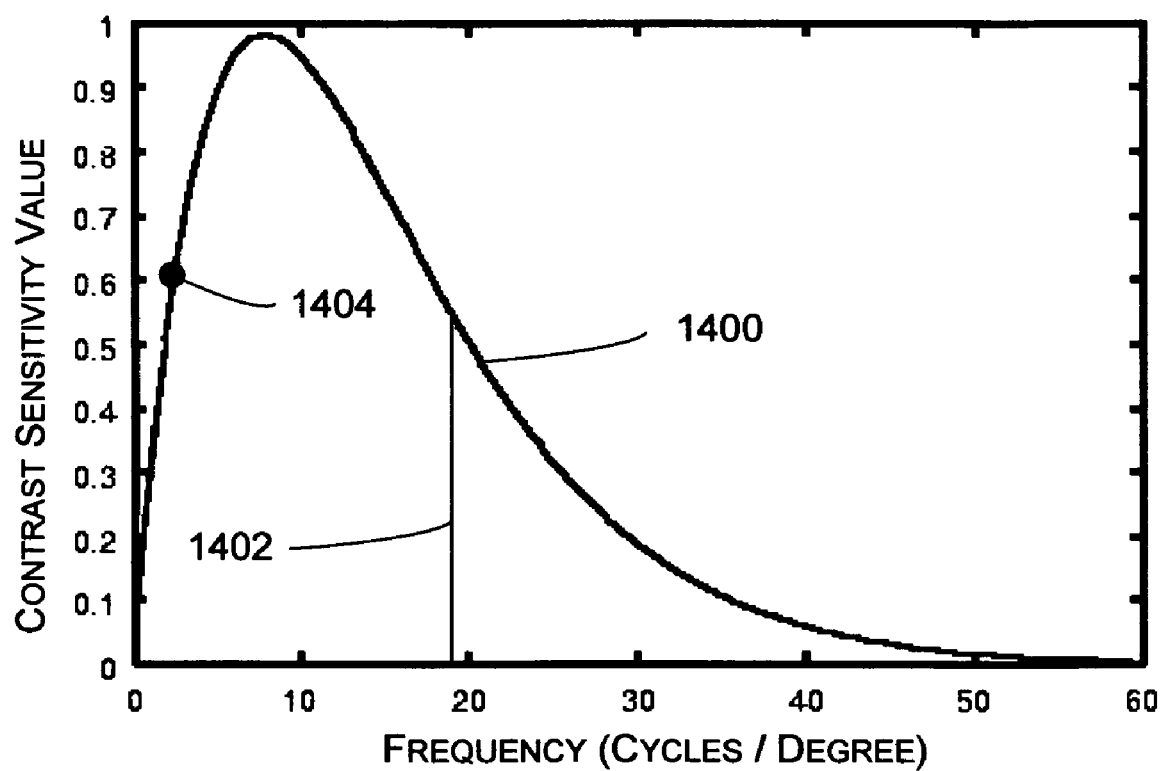
FIG. 14 is a chart generally showing the contrast sensitivity function of human perception.

Using the information generated from the contrast thresholds, a contrast sensitivity function can be generated for the individual. The information generated in the test is basically a plot of contrast threshold (i.e., lowest level at which viewer can contrast differences) for several different frequencies. A contrast sensitivity function 1400 shown in FIG. 14 plots the contrast sensitivity (1/(contrast threshold)) for all spatial frequencies. The contrast sensitivity function 1400 shown in FIG. 14 generally represents a typical shape under ideal conditions (photopic, young adult observers, foveal viewing). In general, individuals are most sensitive to intermediate frequencies (~6-8 cycles per degree), and are less sensitive to lower and higher frequencies.

The contrast sensitivity function shows the observer's window of visibility. Points below the contrast sensitivity function line 1400 (i.e., below the Nyquist limit) are visible to the observer (those are the points that have even higher contrasts than the threshold level). Points above the contrast sensitivity function 1400 are invisible to the observer (those are the points that have lower contrasts than the threshold level).

In accordance with one aspect of the present invention, the contrast sensitivity function is used to calculate the decrease factor β. In general, the decrease factor should be optimized to minimize both jaggies and rippled contours. Too small a decrease factor β should not be used, for excessive lowering of the filter for the bordering pixels may result in jaggies. A good adjustment is a balance between consistent contour and smooth edges. In accordance with one aspect of the present invention, the decrease factor β may be calculated so that it reduces the contrast between adjacent pixels deliberately to hide the contrast from human perception.

The contrast sensitivity function curve is modeled as $A(f) = 04992[1+5.9375f]e^{-(0.114f)^{1.1}}$, and spatial frequency is calculated by the formula:

$$w = 2dtg\frac{\alpha}{2}$$
$$r = \frac{2Rdtg\frac{\alpha}{2}}{W}$$

where r is the pixels in length w, and R is the resolution of screen. The applicants conducted an empirical experiment where d=50 cm, W=34 cm, R=1280 and α=1°, and calculated the value of 32.54 for r.

Having r, the spatial frequency for a line having a given slope may be calculated. For a line with slope k, the intensity value of the line will have a periodical change after about 1/k pixels, so the spatial frequency in cycles/degree can be calculated using r*k. Assuming that slopes from 0.1 to 10 are relevant to the rippled contour (slopes larger or smaller are essentially aligned with pixels), the contrast sensitivity function may be utilized to calculate a best possible value for the decrease factor. For displays having higher resolutions, because the contrast sensitivity of individuals is too low to detect gray level differences, the ripple effect is generally not visible. Thus, in the chart shown in FIG. 14, the contrast sensitivity for the higher cycles/degree (generally higher than 20 cycles/degree, or to the right of the line 1402) is not relevant to the ripple effect. However, at lower frequencies, the rippled effect may be more prevalent. Again viewing the chart in FIG. 14, for the most relevant parts of the contrast sensitivity formula, the more a line tends to horizontal, the lower the contrast sensitivity of human vision, and the easier human eyes detect changes in luminance intensity. Thus, the decrease factor is calculated to eliminate frequencies generated from the lower slope values.

A line with slope value of 0.1 has a spatial frequency of about 3 cycles per degree of viewing. Applicants have therefore calculated β based upon this level. Applicants have found that the value 0.6 for β, which corresponds to the Nyquist level at 3 cycles per degree of viewing (shown at the point 1404 in FIG. 14), works particularly well for the decrease factor. Using this number, a large part of the ripple effect is not viewable by a user at 3 cycles per degree or higher.

Figure 15:
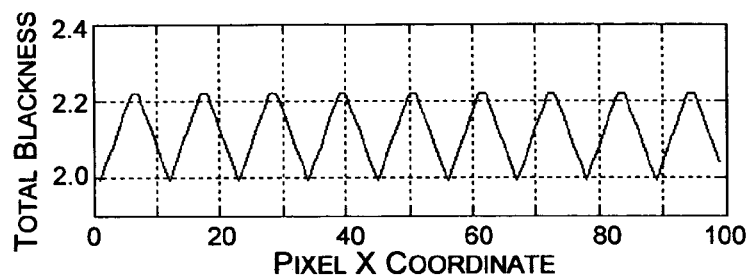
FIG. 15 is a chart generally showing the gray level value along the line (1,1) to (10, 100) after the antialiasing filter of the present invention has been applied in accordance with an aspect of the present invention.

FIG. 15 shows the gray level value along the line (1, 1) to (10, 100) after the antialiasing filter of the present invention has been applied. Compared to FIG. 11, the peak of the ripple is largely reduced (about 50%), and the final rendered image of the line appears very consistent in its width, though at the cost of some loss in luminance.

Application of the above-described antialiasing filter function results in a set of antialiased pixels for each scan line of the straight line segments. The ends of the straight line segments, however, may not align correctly. To prevent rendering of line segments that do not align, the end averaging component 806 of the present invention aligns the pixels at the end of the straight line segments so that the resulting image appears to be smoother. To do this, the pixels at the end of one straight line are weighted with the pixels at the end of an adjacent straight line to form a smooth transition between the lines. The weighted values are then displayed. By "weighting," we mean that the locations of the pixels and the graying of the pixels are adjusted accordingly so that a smooth transition occurs. For example, to smooth a line, a pixel may need to be added to fill a void between two segments. The gray value for the pixel may be weighted depending upon the new pixel's position relative to known pixel gray values.

Figure 16:
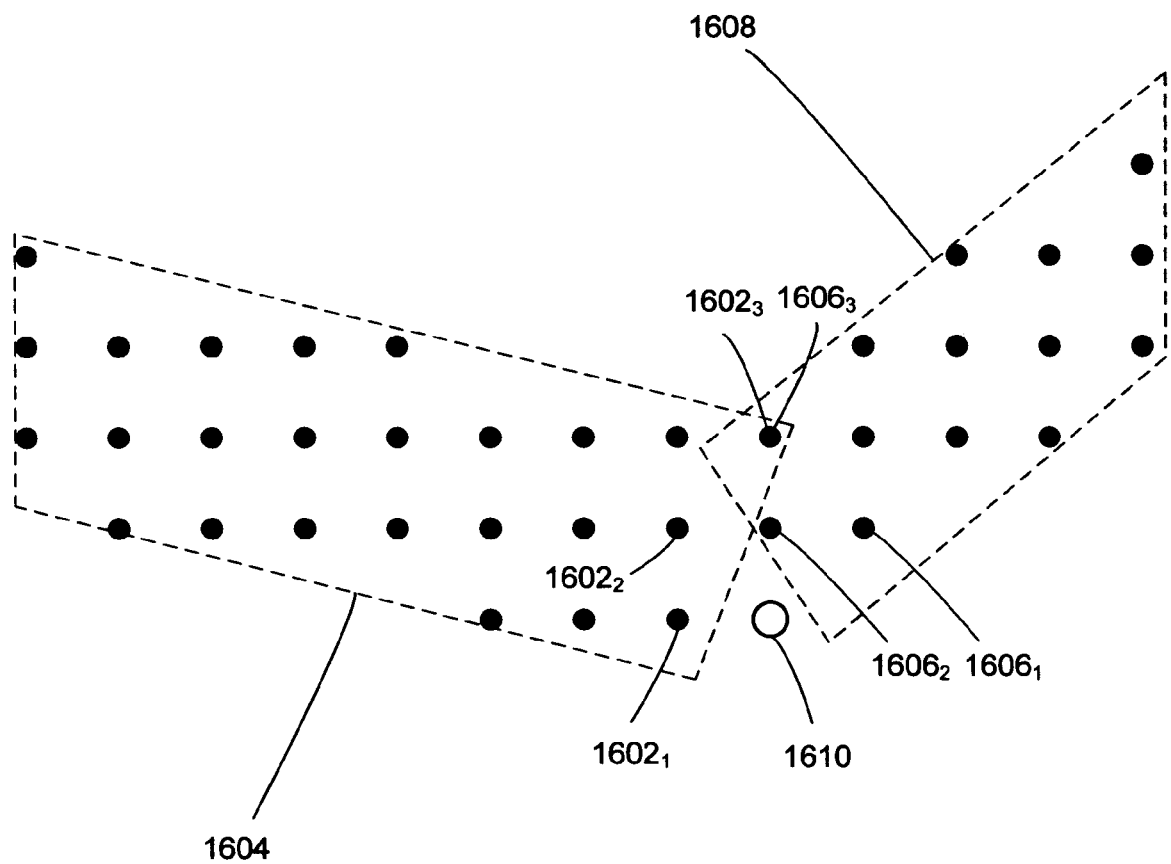
FIG. 16 shows an example of averaging pixels at the end of adjacent straight line segments in accordance with one aspect of the present invention.

A simplified example is shown in FIG. 16. Pixel values 1602₁, 1602₂, 1602₃, at the end of a straight line 1604 are not all exactly aligned with pixel values 1606₁, 1606₂, 1606₃, at the end of the straight line 1608. There may be some locations where there is a gap between the pixels, called a leaking pixel. A leaking pixel occurs when the angle between adjacent line segments exceeds 45 degrees. The leaking pixel occurs on the outer edge of the juncture of the two line segments. For example, the pixel values 1602₁, 1606₁, are separated by a leaking pixel 1610. For each leaking pixel, there may be corresponding pixel locations where two pixels on adjacent line segments are to render. This location is on the inner edge of the juncture of the two line segments (e.g., the pixel values 1602₃, 1606₃). As described further below, the end averaging component 806 alleviates these problems by adding a leaking pixel value at the leaking pixel 1610, and by averaging the gray values at the pixel locations having multiple rendering instructions.

Figure 17:
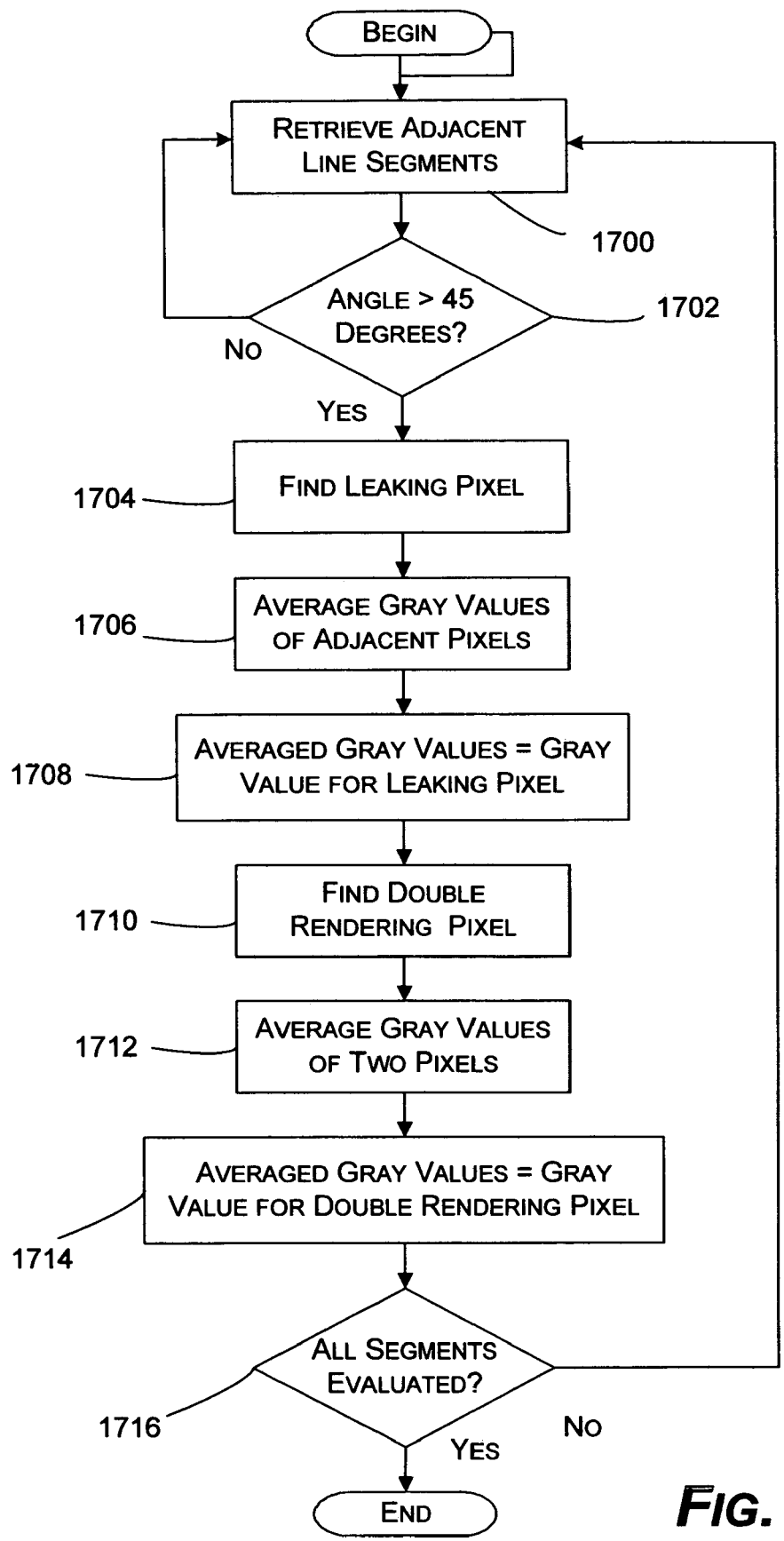
FIG. 17 shows a general overview of a process for averaging pixels at the end of adjacent straight line segments in accordance with one aspect of the present invention.

FIG. 17 shows a general overview of a process for weighting the pixels at the end of adjacent straight line segments (e.g., via the end averaging component 806) in accordance with one aspect of the present invention. Beginning with step 1700, adjacent straight line segments are retrieved, for example, by the end averaging component 806. Then, at step 1702, a determination is made whether the angle between the two line segments exceeds 45 degrees. This determination may be made, for example, by calculating the change in curvatures between the two line segments using the following formula:

$$abs(k1 - k2) \geq \frac{\sqrt{2}}{2}$$

where abs(k1−k2) is the absolute value of the change in slant values of the two line segments.

If the angle does not exceed 45 degrees, step 1702 branches back to step 1700, where the next pair of adjacent pixels are accessed.

If the angle exceeds 45 degrees, step 1702 branches to step 1704, where the leaking pixel is found. This process may involve, for example, calculating the average location between the two outer pixels and finding the pixel that is closest to the location average. For example, the pixel values 1602₁, 1606₁ in FIG. 16 are separated by an empty pixel location. In this example, the averaged position for the two pixels 1602₁, 1606₁ is approximately at the pixel location 1610 located intermediate the two.

At step 1706, the gray values of the two pixels that are adjacent to the leaking pixel position are averaged (e.g., pixels 1602₁, 1606₁). The process then proceeds to step 1708, where the averaged gray value is then set as the gray value for the leaking pixel.

As described above, when a leaking pixel exists, a complementary double rendering pixel typically also exists. At step 1710, the double rendering pixel is found. This step may involve simply finding a pixel for which the two line segments both have pixel information. To address the double rendering pixel, at step 1712, the gray level values of the two pixel values for the pixel are averaged. The averaged gray value is then set as the gray value for the double rendering pixel at step 1714.

At step 1716, a determination is made whether all adjacent segment pairs have been evaluated. If not, the process loops back to step 1700, where the next adjacent segment pair is retrieved. If so, the process ends.

The smoothing process of the present invention smoothes transitions between the straight line segments, creating a more aesthetically-pleasing rendered image. Other alterations to the image may be made using the concepts of the present invention.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer readable storage medium having computer-executable instructions stored thereon that, when executed, cause a computing system to:
   access a digital ink file having a plurality of points on a line;
   calculating which of the points on the line are sharp points, and maintaining only and all sharp points;
   defining segments of the line between the sharp points by mathematical expressions; and
   storing information about the sharp points and the mathematical expressions as a backbone spline of the digital ink file.

2. The computer readable storage medium of claim 1, having further computer-executable instructions comprising combining the backbone spline with information about the digital ink file to create a contour curve for the digital ink file.

3. The computer readable storage medium of claim 1, wherein the information about the digital ink file comprises thickness information.

4. The computer readable storage medium of claim 3, having further computer-executable instructions comprising, denoising the digital ink file prior to combining the backbone spline with the thickness information.

5. The computer readable storage medium of claim 1, having further computer-executable instructions comprising, denoising the digital ink file prior to combining the backbone spline with the information about the digital ink file.

6. The computer readable storage medium of claim 1, wherein the sharp points comprise at least one of:
   points in the digital ink file that deviate the most from straight; or
   points at which curvature reverses.

7. The computer readable storage medium of claim 1, wherein defining the segments between the sharp points by mathematical expressions comprises, subdividing segments that exceed a threshold into subsegments, and defining the subsegments by mathematical expressions.

8. The computer readable storage medium of claim 7, wherein threshold comprises a segment having a turn angle greater than a defined limit.

9. The computer readable storage medium of claim 7, wherein the threshold further comprises a defined error tolerance for the mathematical expressions.

10. The computer readable storage medium of claim 1 having further computer-executable instructions comprising, combining the backbone spline with information about the digital ink file to create a contour curve for the digital ink file and displaying the contour curve.

11. The computer readable storage medium of claim 10, wherein displaying the contour curve further comprises at least one of:
    separating the contour curve into a plurality of straight segments, and rendering the plurality of straight segments,
    applying an antialiasing effect to each of the straight segments, wherein the antialiasing effect compromises an antialiasing filter that filters edges of an image more than the center of the image, and
    aligning the ends of the straight segments by averaging pixels located at the ends of the segments.

12. A computer readable storage medium having computer-executable instructions stored thereon that, when executed, cause a computing system to perform a method comprising:
    separating a digital image file into a plurality of line segments;
    altering each of the line segments to generate a displayable image file for each of the line segments, each displayable image file including a set of pixel values defined for imaging the image file;
    determining whether adjacent line segments exceed angular threshold; and
    when the adjacent line segments exceed the angular threshold, adding a leaking pixel value to the adjacent line segments to smooth the ends of the line segments.

13. The computer readable storage medium of claim 12, wherein altering the line segments comprises applying an antialiasing effect to each of the straight segments, wherein the antialiasing effect comprises an antialiasing filter that filters edges of an image more than the center of the image.

14. The computer readable storage medium of claim 12, wherein determining whether adjacent line segments exceed a threshold comprises determining whether an angle formed between the line segments exceeds a particular angle.

15. The computer readable storage medium of claim 12 wherein a leaking pixel is added, and having further computer-executable instructions comprising, averaging gray values of pixels adjacent to the leaking pixel to form an averaged gray value, and assigning the averaged gray value to the leaking pixel.

16. A computer readable storage medium having computer-executable instructions stored thereon that, when executed, cause a computing system to:
    access a digital image file having a plurality of points on at least one line;
    separate the at least one line of the digital image file into a plurality of line segments;
    calculate which of the points on the at least one line are sharp points;
    for all line segments between two sharp points, determine whether the line segment exceeds a predetermined turn angle threshold and, for all and only those that do, subdivide the line segment into subsegments;
    for all line segments and subsegments, define the line segment and subsegment by a mathematical expression;
    alter each of the line segments and subsegments to generate a displayable image file for each of the line segments and subsegments, each displayable image file including a set of pixel values defined for imaging the image file;

determine whether adjacent line segments exceed an angular threshold; and when the adjacent line segments exceed the angular threshold, adding a leaking pixel value to the adjacent line segments to smooth the ends of the line segments.

17. A computer readable storage medium as recited in claim 16, wherein the predetermined turn angle threshold is $2\pi$.

18. A computer readable storage medium as recited in claim 16, wherein determining whether adjacent line segments exceed an angular threshhold comprises determining whether adjacent line segments are offset by an angle at least equal to 45°.

* * * * *